W. B. CUPPETT.
MACHINE FOR FORMING PLY WOOD PRODUCTS.
APPLICATION FILED JAN. 27, 1921.
1,403,487.
Patented Jan. 17, 1922.
2 SHEETS—SHEET 1.
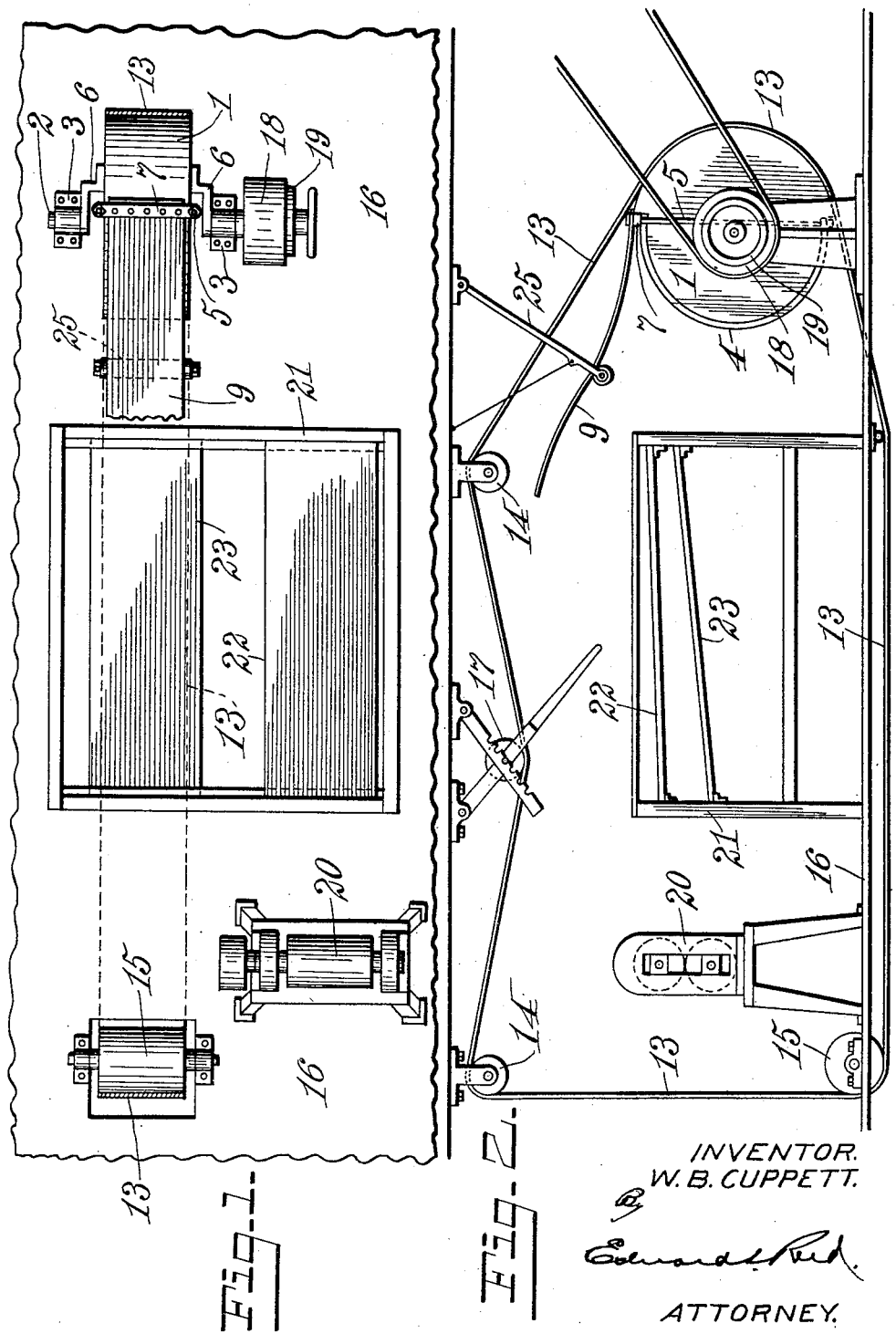
INVENTOR.
W. B. CUPPETT.
ATTORNEY.

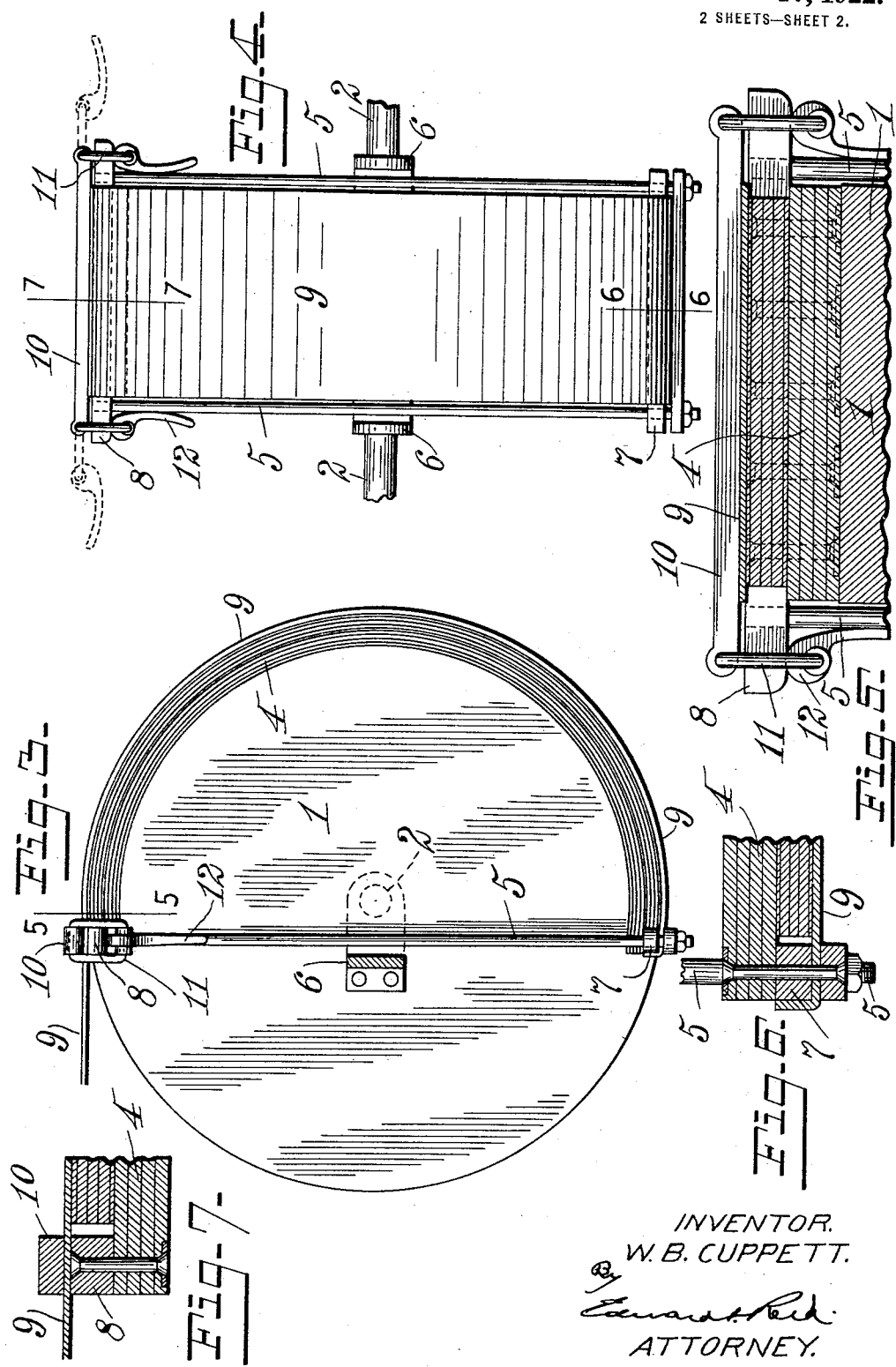

UNITED STATES PATENT OFFICE.

WILLIAM B. CUPPETT, OF PIQUA, OHIO, ASSIGNOR OF ONE-HALF TO KENNETH B. BACKMAN, OF TIPPECANOE CITY, OHIO.

MACHINE FOR FORMING PLY-WOOD PRODUCTS.

1,403,487. Specification of Letters Patent. Patented Jan. 17, 1922.

Application filed January 27, 1921. Serial No. 440,386.

*To all whom it may concern:*

Be it known that I, WILLIAM B. CUPPETT, a citizen of the United States, residing at Piqua, in the county of Miami and State of Ohio, have invented certain new and useful Improvements in Machines for Forming Ply-Wood Products, of which the following is a specification, reference being had therein to the accompanying drawing.

This invention relates to a machine for forming ply wood products and more particularly for forming substantially semi-circular articles formed of a plurality of superimposed layers of ply wood.

One object of the invention is to provide a machine of this kind in which the article can be formed, secured in its formed position, and then removed from the machine as a whole for drying, thus permitting another article to be formed immediately upon the same machine and rendering the operation practically continuous.

A further object of the invention is to provide a machine of this kind which will be simple in its construction and operation and in which the forming device may be readily applied to and removed from the machine as a whole, and which can be manufactured and operated at a relatively low cost.

Other objects of the invention will appear as the machine is described in detail.

In the accompanying drawings Fig. 1 is a plan view, partly broken away of a machine embodying my invention; Fig. 2 is a side elevation of the same; Fig. 3 is a side elevation of the rotatable member and forming device with one of the supporting brackets in section; Fig. 4 is a rear elevation of the rotatable member and forming device; Fig. 5 is a transverse sectional view taken on the line 5—5 of Fig. 3; Fig. 6 is a sectional view taken on the line 6—6 of Fig. 4; and Fig. 7 is a sectional view taken on the line 7—7 of Fig. 4.

In carrying out my invention I provide a rotatable member having removably mounted thereon a forming device, the body portion of which is shaped to conform to the contour of the article to be produced and in connnection with this forming device I provide retaining means for securing the formed article in position thereon and retaining the same in that position after the forming device has been removed from the rotatable member and during the drying operation. Cooperating with the rotatable members are suitable means for bending the superimposed layers of ply wood about the forming device and for retaining them in position until they have been secured by the retaining device. In the accompanying drawing I have illustrated one embodiment of my invention but it will be understood that the particular construction there shown has been chosen for the purpose of illustration only and that the invention may take various forms without departing from the spirit thereof.

In that form of the device here illustrated I have shown the same as comprising a rotatable member, such as a drum 1, which is mounted for rotation about a central axis and is here shown as mounted upon the two parts of a shaft 2 journaled in suitable bearings 3. A portion of the drum is of less radius than the remainder thereof, in the present instance the reduced portion extending for slightly more than a half the circumference of the drum. Mounted upon the reduced portion of the drum is a forming and retaining device comprising a body structure or main forming device 4 which fits upon the reduced portion of the drum 1 and the surface of which conforms to the shape of the article to be produced, which in the present instance, is substantially semicircular. The body portion 4 of the forming device may be formed of any suitable material, such as ply wood, and the ends thereof are connected one to the other by means of rods 5 arranged on the opposite sides thereof and spaced apart a distance greater than the width of the drum 1, thus permitting the forming devices to be slipped onto and off the drum. As the body portion 4 is approximately a semicircle and is of greater length than half the circumference of the drum, the form may be snapped on and off, thereby providing simple means for holding the form on the drum. Inasmuch as the forming device comprises more than a half circle I have shown the drum 1 as connected with the two parts of the shaft 2 by means of offset brackets 6 which permit the rods 5 to pass the center of the drum, as clearly shown in Fig. 3. The rods may be connected with the forming device in any suitable manner but, in the present instance, I have shown the same as secured to the respective ends of cross bars 7 and 8 which are rigidly secured to the outer surfaces of the end portions of the forming device and project beyond the lateral edges thereof. Cooperating with the body structure of the forming device is a retaining device which, as here shown, consists of a strip of flexible material 9, preferably sheet metal, which is permanently secured at one end to the forward end of the forming device and has its other end free. The retaining strip may be secured to the forming device in any suitable manner but is preferably spaced therefrom a distance not greater than the thickness of the finished product to be formed, and, as here shown, the end of the retaining strip, is rigidly secured to the cross bar 7. To form an article on this device the several layers of ply wood are assembled in superimposed relation, glue having been first applied thereto, and one end of the group of layers of ply wood is inserted between the forward end of the forming device and the retaining strip, the drum 1 being so positioned that the said end of the forming device will be at the top of the drum. The drum is then rotated and the ply wood and retaining strip are acted upon by a suitable device which bends them about the forming device 4 and retains them in that position until the free end of the retaining strip 9 can be secured in position. This may be accomplished in any suitable manner but in the present machine I have shown a clamping bar 10 adapted to extend across the rear end of the forming device in engagement with the retaining strip 9. This clamping bar is provided at its ends with links 11 which extend about the respective ends of the cross bar 8 and on the inner ends of the links are mounted cam levers 12 which serve to draw the clamping device tightly into engagement with the retaining strip and thereby lock the formed ply wood in its formed position. When the retaining strip has been secured to the forming device the combined forming and retaining device is removed from the rotatable member and another forming device applied thereto, thus permitting the forming operation to be carried on continuously while the glue on the formed articles is drying.

The means for bending the ply wood about the forming device may be of various kinds but I prefer to employ an endless belt, as shown at 13, which extends about one side of the drum 1 and which will serve to bend the layers of ply wood about the form and to press the same very tightly into engagement one with the other. As here shown, the belt extends from the upper edge of the drum about overhead pulleys 14 and thence about a floor pulley 15, beneath the floor, which is shown at 16, and upwardly through the floor about the lower side of the drum. In this manner the belt does not in any way interfere with the operation of assembling the ply wood adjacent to the forming machine and the application of the forms 2 and their removal from the rotatable member, as the operators can work beneath the overhead stretch of belt. Preferably a belt tightening device 17 is provided for maintaining the belt at the proper tension. The belt itself is driven from the drum 1 to which power may be applied from any source, as by means of a belt pulley 18, loosely mounted on one end of the shaft 2 and adapted to be connected with and disconnected from said shaft by a clutch 19, of any suitable kind.

In the present installation I have shown the forming machine as associated with a glue applying device and an assembling table, but obviously these are not necessarily of the character or arrangement here shown.

In Figs. 1 and 2 of the drawings I have shown a glue applying device in conventional form at 20, this device being arranged at one side of the vertical plane of the belt 13. Arranged between the glue applying device and the rotatable member of the forming machine is an assembling table 21 which comprises two laterally movable table tops, or shelves, 22 and 23 which are slidably mounted in different planes for movement from one side of the table to the other.

In the operation of the device the sections of veneer, or ply wood, are received from the glue applying machine onto that table top, 22 or 23, which is in line with said machine and are assembled in superimposed relation. The table top with the assembled ply wood thereon is then pushed to the opposite side of the table where it will be in line with the forming device and the other table top is drawn into alinement with the glue applying machine and a second group of ply wood sections is assembled thereon, while another operator inserts the first group into the forming machine by placing the end thereof between the main structure 4 of the forming device and the retaining strip 9, the rotatable member being positioned with the forward end of the forming device at the top thereof and the free end of the retaining strip being supported by a yoke, or swing, 25, pivotally supported on an overhead structure, such as a ceiling, as shown in Fig. 2. The clutch is then operated to cause the drum to be rotated, thereby causing the assembled ply wood sections and the retaining strip to be drawn beneath the belt and to be bent about the form 4. The rotatable member is rotated a distance sufficient to cause the ply wood sections to be bent completely into engagement with the form and is then stopped.

In the present instance, the amount of rotation required for this purpose would be somewhat more than a half rotation. When the rotatable member is stopped the rear end of the form 4 is in its uppermost position and the clamping device 10 is then applied to the retaining strip to secure the same and the several sections of ply wood in their formed positions. When this has been done the combined forming and retaining device is removed from the rotatable member and set aside to permit the glue to dry. Another forming and retaining device is then placed upon the rotatable member and the cycle of operations is repeated. The present machine is designed to receive relatively wide sections of ply wood and the formed article, after drying, is cut into strips of the desired width, but obviously the machine may be made to receive sections of any desired width.

While I have shown and described one embodiment of my invention I wish it to be understood that I do not desire to be limited to the details thereof as various modifications may occur to a person skilled in the art.

I further wish it to be understood that the term "ply wood" is not intended to be limited to any particular kind of material but is to include material of any kind which is capable of being formed in the manner set forth.

Having now fully described my invention what I claim as new and desire to secure by Letters Patent, is:

1. In a wood bending machine, a circular support, a curved form, said form being of greater length than half the circumference of said support and adapted to snap on and off said support, said form adapted to receive the wood to be bent, wood bending means cooperating with said support and form, and clamping means on said form.

2. In a wood bending machine, a circular support, a curved form, said form being of greater length than half the circumference of said support and adapted to snap on and off said support, tie rods connecting opposite ends of said form, said form adapted to receive the wood to be bent, wood bending means cooperating with said support and form, and clamping means on said form.

3. In a wood bending machine, a revolving circular support, a curved form, said form being of greater length than half the circumference of said support and adapted to snap on and off said support, tie rods connecting opposite ends of said form, said form adapted to receive the wood to be bent, offset brackets mounted on said support and adapted to permit the said tie rods to pass the center of the support, wood bending means cooperating with said support and form, and clamping means on said form.

4. In a wood bending machine, a circular support, a curved form, said form being of greater length than half the circumference of said support and adapted to snap on and off said support, cross bars mounted at the ends of said form and providing a pocket adapted to receive the wood to be bent, tie rods connecting said cross bars, wood bending means cooperating with said support and form, and clamping means on said form.

5. In a machine for forming ply wood products, a rotatable drum having one side thereof of a less radius than the other side thereof, a forming device mounted on the reduced portion of said drum, a belt extending about said drum and adapted to engage a group of superimposed sections of ply wood and bend the same about said forming device when said drum is rotated, and means for securing said sections of ply wood to said forming device in their bent positions.

6. In a machine for forming ply wood products, a drum having a portion of its circumferential area reduced in radius, a forming device adapted to fit about the reduced portion of said drum, tie rods connecting the ends of said forming device and spaced apart a distance greater than the width of said drum to permit said forming device to be removably mounted on said drum, a belt passing about said drum and adapted to engage a group of superimposed sections of ply wood to bend the same about said forming device, and means for securing the bent sections of ply wood to said forming device.

7. In a machine for forming ply wood products, a rotatable drum having a reduced portion, a substantially semicircular forming device adapted to be mounted on the reduced portion of said drum, cross bars secured to the respective ends of said forming device and extending laterally beyond the same, tie rods extending through the end portions of said bars to retain the ends of said forming device in their proper relative positions, a retaining strip having one end secured to that cross bar at the forward end of said forming device, means cooperating with said drum to bend a group of superimposed sections of ply wood about said forming device, and a clamping device cooperating with the other cross bar of said forming device to secure the free end of said retaining strip to said forming device and thus retain said group of ply wood sections in their bent positions.

8. In a machine for forming ply wood products, a drum, brackets secured to said drum and journaled in bearings arranged in line with the center of said drum, whereby said drum may be rotated about the axis of said brackets, a forming device removably mounted on said drum, tie rods to connect the ends of said forming device one to the other, said tie rods being spaced apart a distance greater than the width of said drum, and being adapted to extend past the center of said drum between said brackets and said drum, means cooperating with said drum to bend a group of superimposed sections of ply wood about said forming device, and means for retaining said sections of ply wood in their bent positions on said forming device.

9. In a machine for forming ply wood products, a rotatable drum, a forming device removably mounted thereon, a belt passing about said drum, extending upwardly therefrom about overhead guides, thence downwardly beneath the floor above which said drum is supported, and thence about said drum, means for actuating said drum and said belt to cause a group of superimposed sections of ply wood to be bent about said forming device, and a retaining device to secure said sections of ply wood in their bent positions on said forming device.

In testimony whereof, I affix my signature hereto.

WILLIAM B. CUPPETT.